(12) United States Patent
Banat et al.

(10) Patent No.: US 10,822,433 B2
(45) Date of Patent: Nov. 3, 2020

(54) PROCESS FOR TRANSITIONING BETWEEN INCOMPATIBLE CATALYSTS

(71) Applicant: SABIC GLOBAL TECHNOLOGIES B.V., Bergen op Zoom (NL)

(72) Inventors: Yahya Banat, Geleen (NL); Abdulaziz Hamad Al-Humydi, Riyadh (SA); Said Fellahi, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/063,935

(22) PCT Filed: Nov. 29, 2016

(86) PCT No.: PCT/EP2016/079099
§ 371 (c)(1),
(2) Date: Jun. 19, 2018

(87) PCT Pub. No.: WO2017/108347
PCT Pub. Date: Jun. 29, 2017

(65) Prior Publication Data
US 2020/0270373 A1  Aug. 27, 2020

(30) Foreign Application Priority Data

Dec. 22, 2015 (EP) ..................... 15201875

(51) Int. Cl.
*C08F 2/01* (2006.01)
*C08F 2/34* (2006.01)
(Continued)

(52) U.S. Cl.
CPC ............. *C08F 2/001* (2013.01); *C08F 2/01* (2013.01); *C08F 2/34* (2013.01); *C08F 4/6592* (2013.01); *B01J 8/26* (2013.01); *C08F 2410/05* (2013.01)

(58) Field of Classification Search
CPC .... C08F 2/001; C08F 2/01; C08F 2/34; C08F 4/6592; C08F 2410/05; B01J 8/26
(Continued)

(56) References Cited

U.S. PATENT DOCUMENTS 3,687,920 A  8/1972  Johnson
3,709,853 A  1/1973  Karapinka
(Continued)

FOREIGN PATENT DOCUMENTS

| EP | 2610269 A1 | 7/2013 |
|---|---|---|
| WO | 9214766 A1 | 9/1992 |
| WO | 2004060930 A2 | 7/2004 |

OTHER PUBLICATIONS

International Search Report for International Applicaiton No. PCT/EP2016/079099, International Filing Date Nov. 29, 2016, dated Feb. 6, 2017, 5 pages.
(Continued)

*Primary Examiner* — William K Cheung
(74) *Attorney, Agent, or Firm* — Cantor Colburn LLP

(57) ABSTRACT

The invention relates to a process for transitioning from a first continuous polymerization in a gas phase reactor conducted in the presence of a metallocene catalyst to a second polymerization conducted in the presence of a Ziegler-Natta catalyst in the gas phase reactor wherein the metallocene catalyst and the Ziegler-Natta catalysts are incompatible, the process comprising: (a) discontinuing the introduction of the metallocene catalyst into the gas phase reactor; (b) introducing an effective amount of cyclohexylamine into the reactor to at least partially deactivate the metallocene catalyst; (c) introducing an organometallic compound into the reactor and reacting the organometallic compound with cyclohexylamine; (d) degas the gas composition of the reactor and build up a new composition inside the reactor for
(Continued)

the second polymerization with the Ziegler-Natta catalyst (e) introducing the Ziegler-Natta catalyst into the reactor.

18 Claims, 1 Drawing Sheet

(51) Int. Cl.
*B01J 8/26* (2006.01)
*C08F 2/00* (2006.01)
*C08F 4/6592* (2006.01)

(58) Field of Classification Search
USPC .......................................................... 526/69
See application file for complete search history.

(56) References Cited

U.S. PATENT DOCUMENTS

| | | |
|---|---|---|
| 4,003,712 A | 1/1977 | Miller |
| 4,011,382 A | 3/1977 | Levine et al. |
| 4,086,408 A | 4/1978 | Karol et al. |
| 4,101,445 A | 7/1978 | Levine et al. |
| 4,302,566 A | 11/1981 | Karol et al. |
| 4,376,191 A | 3/1983 | Geck |
| 4,482,687 A | 11/1984 | Noshay et al. |
| 4,543,399 A | 9/1985 | Jenkins, III et al. |
| 4,560,671 A | 12/1985 | Gross et al. |
| 4,588,790 A | 5/1986 | Jenkins, III et al. |
| 4,719,193 A | 1/1988 | Levine et al. |
| 4,755,495 A | 7/1988 | Cann et al. |
| 4,798,081 A | 1/1989 | Hazlitt et al. |
| 4,882,400 A | 11/1989 | Dumain et al. |
| 5,019,633 A | 5/1991 | Wagner et al. |
| 5,070,055 A | 12/1991 | Schramm et al. |
| 5,352,749 A | 10/1994 | Dechellis et al. |
| 5,442,019 A | 8/1995 | Agapiou et al. |
| 5,541,270 A | 7/1996 | Chinh et al. |
| 5,672,666 A | 9/1997 | Muhle et al. |
| 5,753,786 A | 5/1998 | Agapiou et al. |
| 6,858,684 B2 | 2/2005 | Burdett et al. |
| 6,949,612 B2 | 9/2005 | Agapiou et al. |
| 7,122,607 B2 | 10/2006 | Hagerty et al. |
| 7,300,987 B2 | 11/2007 | Hagerty et al. |
| 2004/0127655 A1 | 7/2004 | Veariel et al. |
| 2004/0186250 A1* | 9/2004 | Kinnan ................... C08F 10/00 526/82 |

OTHER PUBLICATIONS

Wild et al., "Determination of Branching Distributions in Polyethylene and Ethylene Copolymers", Journal of Polymer Science: Polymer Physics Edition, vol. 20, 1982, pp. 441-455.

Written Opinion for International Applicaiton No. PCT/EP2016/079099, International Filing Date Nov. 29, 2016, dated Feb. 6, 2017, 4 pages.

* cited by examiner

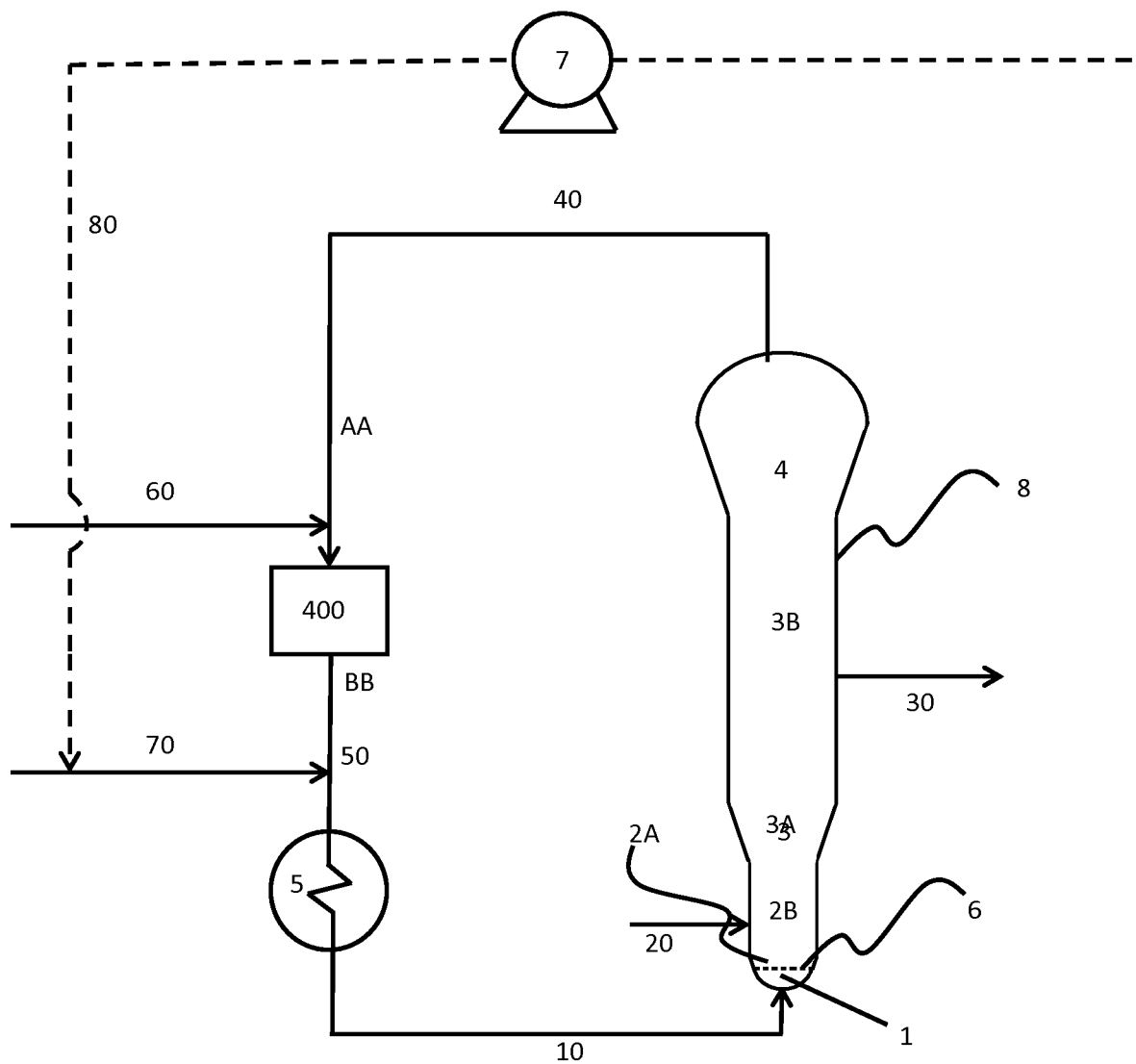

PROCESS FOR TRANSITIONING BETWEEN INCOMPATIBLE CATALYSTS

CROSS REFERENCE TO RELATED APPLICATIONS

This application is a National Stage application of PCT/EP2016/079099, filed Nov. 29, 2016, which claims the benefit of European Application No. 15201875.0, filed Dec. 22, 2015, both of which are incorporated by reference in their entirety herein.

This invention relates to a process for transitioning between incompatible polymerization catalyst. Particularly, the invention relates to a process for transitioning between an olefin polymerization utilizing a metallocene catalyst to an olefin polymerization utilizing Ziegler-Natta catalyst in a continuous polymerization process.

Metallocenes revolutionized the last decade by developing products that have improved characteristics compared to traditional Ziegler-Natta catalyst based products. Metallocene and single site catalyst based products provided: (1) narrower molecular weight distribution, (2) better comonomer incorporation and (3) lower densities—compared to conventional Z—N based products. These characteristics provided several advantages at the end user level including: (1) impact strength, (2) clarity, (3) organoleptic properties, (4) heat-seal characteristics and most importantly an opportunity to downgage.

Metallocene-LLDPE has been targeted for mono layer and multi-layer blown film and packaging applications. Commercial applications of LLDPE are notably in the blown and cast film use, such as stretch film, as well as can liners and heavy duty sacks. It has provided end users with many advantages such as: (1) increased packaging speeds due to lower seal initiation temperature, higher hot tack, and reduced blocking; (2) reduced package failures due to greater toughness and superior resistance to abuse; (3) improved package artistic due to lower haze and higher gloss; and (4) improved packaged product quality due to reduced package-product interactions, lower odor and extractability, etc. LLDPE for producing films requires that no gel is formed during the production of LLDPE.

It is frequently necessary to transition from one type of catalyst producing polymers having certain properties and characteristics to another catalyst capable of producing polymers of different chemical and/or physical attributes. Transitioning between similar Ziegler-Natta catalysts or compatible catalysts generally takes place easily. Compatible catalysts are those catalysts having similar kinetics of termination and insertion of monomer and co-monomer (s) and/or do not detrimentally interact with each other.

However, the process is typically complicated when the catalysts are incompatible or of different types. For example, when transitioning between two incompatible catalysts such as a Ziegler-Natta catalyst and a metallocene catalyst, it has been found that some of the components of the Ziegler-Natta catalyst act as poisons to the metallocene catalyst. Consequently, the components of the Ziegler-Natta catalyst prevent the metallocene catalyst from promoting polymerization.

Furthermore, particularly in a continuous transition process, the interaction between two incompatible catalysts may lead to the production of high levels of small particles less than about 120 microns that are referred to as "fines". Fines can induce operability problems in the reactor and/or fouling and sheeting incidents.

In the past, to accomplish an effective transition between incompatible catalysts, the first catalyzed olefin polymerization process was stopped by various techniques known in the art. The reactor was then emptied, recharged and a second catalyst was introduced into the reactor. Such catalyst conversions are time consuming and costly because of the need for a reactor shut-down for an extended period of time during transition and the off-grade material.

There have been many attempts to improve the process for transitioning between incompatible catalysts.

Naturally, in order to inhibit polymerization of a first incompatible catalyst, it is necessary to interrupt catalyst injection into the reactor. Stopping the first catalyst feed into the reactor does not immediately stop polymerization occurring within the reactor because the fluidized bed contains catalyst particles which can still polymerize for an extended period of time. Even if one were to allow the polymerization within the reactor to continue for a period of time, the catalyst within the reactor would not be completely deactivated for a considerable period.

Thus, to at least partially deactivate the metallocene catalyst, polymerization inhibitors or catalyst killers are employed. There are two general types of catalyst killers: reversible catalyst killers and irreversible catalyst killers. Reversible catalyst killers typically initially inhibit catalyst activity and polymerization for a period of time, but, do not irreversibly deactivate the catalyst. In fact, after a period of time under normal polymerization conditions the catalysts reactivate and polymerization will continue.

These reversible catalyst killers can be used in any combination or order of introduction in the process. Irreversible catalyst killers irreversibly inactivate a catalyst's ability to polymerize olefins. The use of catalyst killing and/or deactivating agents is disclosed in U.S. Pat. Nos. 5,442,019, 5,753,786, and 6,949,612 B2 to Agapiou et al., U.S. Pat. No. 5,672,666 to Muhle et al., and U.S. Pat. No. 6,858,684 B2 to Burdett et al.

U.S. Pat. No. 5,442,019 describes a process for transitioning from a Ziegler-Natta catalyst to a metallocene catalyst by introducing into the reactor an irreversible catalyst killer in an amount greater than about 1 molar equivalent based on the total gram atom metal of the Ziegler-Natta catalyst in the reactor and introducing the metallocene into the reactor. Water is mentioned as the preferred irreversible catalyst killer. The reactor is made substantially free of the irreversible catalyst killer by the introduction of an organometallic compound into the reactor. The organometallic compound reacts with some of the irreversible catalyst killer converting the killer to compounds that can be easily purged or removed from the reactor.

It would be advantageous to provide a catalyst transitioning process without the need for halting the polymerization, emptying the reactor to rid it of the original catalyst and restarting the polymerization with another catalyst. In addition, it would be advantageous if the process for transitioning could reduce the amount of off-grade material produced during the transition process, reduce the transition time, increase the robustness and stability of the transition process and avoid the need to open the reactor to charge the seed bed.

It would further be advantageous to provide a catalyst transitioning process in which fouling of the reactor is prevented.

It is an object of the present invention to provide a process in which above-described and/or other problems are solved.

Accordingly, the present invention provides a process for transitioning from a first continuous polymerization in a gas phase reactor conducted in the presence of a metallocene catalyst to a second polymerization conducted in the presence of a Ziegler-Natta catalyst in the gas phase reactor wherein the metallocene catalyst and the Ziegler-Natta catalyst are incompatible, the process comprising or consisting of:

(a) discontinuing the introduction of the metallocene catalyst into the gas phase reactor;

(b) introducing an effective amount of cyclohexylamine into the reactor to at least partially deactivate the metallocene catalyst;

(c) introducing an organometallic compound into the reactor and reacting the organometallic compound with cyclohexylamine;

(d) degasing the gas composition of the reactor and build up a new composition inside the reactor for the second polymerization with the Ziegler-Natta catalyst (e) introducing the Ziegler-Natta catalyst into the reactor.

The invention thereby relates for example to a process for transitioning between incompatible catalysts to convert a reactor from producing one type of product to another with minimal reactor down-time.

For the purposes of this patent specification and appended claims, the term "incompatible catalysts" are understood as those that satisfy one or more of the following: 1) those catalysts that in each other's presence reduce the productivity of at least one of the catalysts by greater than 50%; 2) those catalysts that under the same reactive conditions one of the catalysts produces polymers having a molecular weight (Mw) greater than two times higher than any other catalyst in the system; and 3) those catalysts that differ in comonomer incorporation or reactivity ratio under the same conditions by more than about 30%.

Productivity is herein understood as kg of product per kg of catalyst over a certain period of time. Mw is herein understood as the weight average molecular weight as measured using SEC (Size Exclusion Chromatography using 1,2,4-trichlorobenzene as an eluent, and calibrated using linear polyethylene standards. The comonomer incorporation is measured by the analytical temperature rising elution fractionation (aTREF) conducted according to the method described in U.S. Pat. No. 4,798,081 and Wilde, L.; Ryle, T. R.; Knobeloch, D. C; Peat, L R.; Determination of Branching Distributions in Polyethylene and Ethylene Copolymers, J. Polym. ScL, 20, 441-455 (1982), which are incorporated by reference herein in their entirety. The composition to be analyzed is dissolved in 1,2-dichlorobenzene of analytical quality filtrated via 0.2 µm filter and allowed to crystallize in a column containing an inert support (Column filled with 150 µm stainless steel beans (volume 2500 µL) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (1,2-dichlorobenzene) from 20 to 130° C. at a rate of 1° C./min.

Cyclohexylamine acts as an irreversible catalyst killer for the metallocene catalyst. An organometallic compound is subsequently added which reacts with the remaining cyclohexylamine in the reactor. The reaction of cyclohexylamine and the organometallic compound advantageously forms a product which acts as a continuity aid agent, which assists in reducing fouling and/or sheeting on the walls of the reactor and/or reactor components. Therefore, according to the process of the invention, the in-situ formation of a continuity aid agent is advantageously provided.

This is particularly advantageous compared to prior art systems in which the irreversible catalyst killer is reacted with an organometallic compound only to be purged, without the reaction product having any advantageous function. For example, the use of water as irreversible catalyst killer and the subsequent addition of trimethylaluminum (TMAL) as in the process of U.S. Pat. No. 5,442,019 leads to formation of methylalumoxane (MAO). MAO is a known cause for fouling of the reactor. When alumoxane, such as methyl alumoxane (MAO) is used as cocatalyst in the polymerization at temperatures about or greater than 40° C., the alumoxane MAO may dissolve and extract the metallocene catalyst from the support forming a soluble catalyst in the polymerization medium. This soluble catalyst easily deposits polymer onto the reactor walls and/or generates very small particles of low bulk density which are undesirable in a commercial reactor.

The product acting as a continuity aid agent formed in step (c) is preferably circulated in the reactor for 0.2-2 hours before it is purged. Preferably, the organometallic compound is introduced through the same feedline as the cyclohexylamine.

According to the process of the invention, the amount of cyclohexylamine and the organometallic compound added can be optimized for minimizing the duration of the transitioning process by monitoring the static in the reactor. The addition of cyclohexylamine to the fluidized polymer particles inside the reactor may lead to an increase in the static to the positive side. Before the static reaches an undesirable high level, the introduction of cyclohexylamine can however be stopped. Subsequently the organometallic compound is introduced until the static decreases to zero or negative.

Subsequently, in step (d), a gas composition for the second polymerization is introduced into the reactor.

Preferably, the process according to the invention further comprises the step of (d2) introducing a reaction product of an organometallic compound, especially an organometallic compound that comprises aluminum and an amine compound after step (d) and before step (e). This reaction product may act as a continuity aid agent.

Subsequently, the Ziegler-Natta catalyst is introduced into the reactor in step (e).

The process according to the invention may further comprise the step of introducing a reversible catalyst killer between steps (a) and (b).

Preferably, the process of the invention is continuous.

In particularly preferred embodiments, the process according to the invention comprises or consist of:

(a) discontinuing the introduction of the metallocene catalyst into the gas phase reactor;

(b) introducing an effective amount of cyclohexylamine into the reactor to at least partially deactivate the metallocene catalyst;

(c) introducing an organometallic compound, especially an organometallic compound that comprises aluminum, preferably tri-isobutylaluminum, into the reactor and reacting the organometallic compound that comprises aluminum with cyclohexylamine;

(d) degasing the gas composition of the metallocene catalyst and build up the new composition inside the reactor for the second polymerization with the Ziegler-Natta catalyst (d2) introducing a reaction product of an an organometallic compound, especially an organometallic compound that comprises aluminum, preferably tri-isobutylaluminum, and an amine, preferably octadecylamine and/or cyclohexylamine and (e) introducing the Ziegler-Natta catalyst the reactor.

The polymerization catalysts used in the present invention are solid catalysts. The solid polymerization catalyst may be fed to the reactor as a suspension in a solvent, for example a hydrocarbon solvent or the like, or in an inert gas, such as nitrogen. The solid polymerization catalyst may also be injected into the reactor as a dry catalyst.

The Ziegler-Natta catalyst may be fed as a suspension in a solvent or as a dry catalyst and/or the the metallocene catalyst may be fed as a dry catalyst or as a suspension in a solvent.

Polymerization

The first polymerization and the second polymerization may be a continuous polymerization of one or more α-olefin monomers of which at least one is ethylene or propylene. Preferred α-olefin monomers include for example α-olefins having from 4 to 8 carbon atoms. However, small quantities of α-olefin monomers having more than 8 carbon atoms, for example 9 to 18 carbon atoms, such as for example a conjugated diene, can be employed if desired. Thus it is possible to produce homopolymers of ethylene or propylene or copolymers of ethylene and/or propylene with one of more α-olefin monomers having from 4 to 8 α-olefin monomers. Preferred α-olefin monomers include but are not limited to but-1-ene, isobutene, pent-1-ene, hex-1-ene, hexadiene, isoprene, styrene, 4-methylpent-1-ene, oct-1-ene and butadiene. Examples of α-olefin monomers having more than 8 carbon atoms that can be copolymerized with an ethylene and/or propylene monomer, or that can be used as partial replacement for α-olefin monomers having from 4 to 8 α-olefin monomers include but are not limited to dec-1-ene and ethylidene norbornene.

When the process of the invention is used for the copolymerization of ethylene and/or propylene with α-olefin monomers, the ethylene and/or propylene preferably is used as the major component of the copolymer. For example, the amount of ethylene and/or propylene present in the copolymer is at least 65% by weight, for example at least 70% by weight, for example at least 80% by weight based on the total copolymer.

With 'continuous polymerization of one or more α-olefins' or 'continuous preparation of polyolefin' is meant herein that one or more α-olefin monomers of which at least one is ethylene or propylene are fed to the reactor, preferably continuously, and polyolefin thus produced is (semi)-continuously withdrawn through a polymer discharge system connected to the reactor.

The continuous polymerization of one or more α-olefin monomers will produce polyolefins in the form of particles, herein also referred to as 'polyolefin'. Examples of polyolefins which may be produced, include a wide variety of polymers, for example polyethylene, for example linear low density polyethylene (LLDPE), which may for example be prepared from ethylene and but-1-ene, 4-methylpent-1-ene or hex-1-ene, high density polyethylene (HDPE), which may for example be prepared from ethylene or from ethylene with a small portion of an α-olefin monomer having from 4 to 8 carbon atoms, for example but-1-ene, pent-1-ene, hex-1-ene or 4-methylpent-1-ene. Other examples include but are not limited to plastomers, elastomers, medium density polyethylene, polypropylene homopolymers and polypropylene copolymers, including random copolymers, and block or multi-block copolymer and ethylene propylene rubber (EPR).

Preferably, in the process of the invention, the polyolefin produced is a polyethylene, more preferably a linear low density polyethylene.

Fluidized Bed

The process of this invention can be used in any polymerization process in a gas phase reactor. The gas phase reactor may be any reactor suitable for gas phase polymerizations and may e.g. be vertically, horizontally mechanically agitated reactor or a fluidized bed reactor. A gas phase polymerization process in a fluidized bed reactor is preferred. In a typical continuous gas fluidized bed polymerization process for the production of polymer from monomer, a gaseous stream comprising monomer is passed through a fluidized bed reactor in the presence of a catalyst under reactive conditions.

Conventionally, gas phase polymerization processes typically run continuously, therefore the temperature of the fluidized bed reactor is controlled to an essentially isothermal level through continuously removing the heat of polymerization by circulating the gas exiting from the fluidized bed to a condenser/heat exchanger outside the reactor and recirculating the cooled gas stream back into the reactor. When the temperature of the recirculating stream introduced or recycled into the fluidized bed polymerization reactor is above the dew point temperature, substantially no liquid is present. This process is known as the "dry mode" process. One method to maximize the ability of heat removal is, throughout the operation, to reduce to the lowest possible value the temperature of the gaseous feed stream into the reactor.

According to the "condensed mode" process a two phase mixture comprising liquid and gas is used into the fluidized bed as a fluidizing medium, the liquid portion of which vaporizes when it is exposed to the heat of the reactor. Fluid can be formed by cooling the recycle stream withdrawn from the reactor below the dew point temperature, thereby converting a portion of the gas into a liquid, and the cooled recycle stream can then be reintroduced into the fluidized bed polymerization reactor. The objective here is to take advantage of the cooling effect brought about by the vaporization, i.e., by bringing the temperature of the fluidized bed down to a point where degradation of the polymer and the catalyst can be avoided and agglomeration of the polymer and chunking can be prevented. The liquid phase/portion is provided by a portion of the recycle gases, which includes monomers and low boiling liquid hydrocarbons, inert to the reaction conditions needed for polymerization, and condensation. Condensed mode fluidized bed reactor polymerization processes are disclosed in for example in U.S. Pat. Nos. 4,543,399 and 4,588,790. These publications describe the introduction of an inert liquid into the recycle stream to increase the dew point temperature of the recycle stream and allow the process to operate at levels of up to 17.4% liquid by weight, based on the total weight of the cooled recycle stream. A condensed mode process is advantageous because its ability to remove greater quantities of heat generated by polymerization increases the polymer production capacity of a fluidized bed polymerization reactor. A common liquid hydrocarbon used in the liquid phase/portion is isopentane, which boils at about 27° C., and consequently becomes a vapor in the recycle line in view of the heat present in the recycle gases. The recycle gases leave the reactor, are cooled, and then condensed to the extent that a vapor phase/portion and liquid phase/portion are formed. The velocity of the recycled gas/liquid mixture should be sufficient to support the fluidized bed, but slow enough to avoid excessive entrainment of fines. The cooling capacity should be sufficient to improve the production rate in terms of space/time/yield.

"Super condensed mode" fluidized bed reactor polymerization processes operate with above 17.4% liquid by weight in the cooled recycle stream as described for example in U.S. Pat. No. 5,352,749. These must be confined under certain more specific and restrictive conditions within a limited and known range of operating conditions to avoid destabilizing the fluidized bed, thereby halting the process.

Gas fluidized bed polymerization process generally employ a continuous gas cycle. In one part of the cycle, in a reactor a cycling gas stream is heated by the heat of polymerization. This heat is removed in another part of the cycle by a cooling system external to the reactor. In one embodiment the cycle gas stream is cooled to form a gas and a liquid phase mixture that is then introduced into the reactor. A polymer product is withdrawn from the reactor. For a detailed description of a gas phase process see U.S. Pat. Nos. 4,543,399 and 4,588,790 herein fully incorporated by reference.

Using a fluidized bed polymerization process substantially reduces the energy requirements as compared to other polymerization processes and most importantly reduces the capital investment required to run such a polymerization process. In preferred embodiments, the fluidized bed is maintained in a fluidized condition during the process of this invention.

There are many types of fluidized bed reactors, among which a bubbling fluidized bed reactor, a circulating fluidized bed reactor, an annular fluidized bed reactor, a multi-zone fluidized bed reactor and a flash reactor.

The process according to the invention is preferably performed in a multi-zone fluidized bed reactor.

With 'fluidized bed' as used herein is meant that an amount of solid and/or polymer particles (in this case preferably the solid catalyst and/or the solid catalyst to which the monomer is attached) in a solid/fluid mixture acts as a fluid. This may be achieved by placing the amount of solid and/or polymer particles under appropriate conditions, for instance by the introduction of a fluid through the solid and/or polymer particles at a velocity enough to suspend the solid and/or polymer particles and causing them to behave as a fluid.

An example of a process using a fluidized bed for producing polyolefins is disclosed in U.S. Pat. No. 4,882,400. Other examples of processes using a fluidized bed for producing polyolefins are described in, for example, U.S. Pat. Nos. 3,709,853; 4,003,712; 4,011,382; 4,302,566; 4,543,399; 4,882,400; 5,352,749; 5,541,270; 7,122,607, and 7,300,987. The bottom of a fluidized bed reactor (FBR) can comprise for example an inlet connected to a feeder for the reaction composition such as ethylene, nitrogen (N2), hydrogen (H2), comonomer, tri-isobutylamine (TIBAL)-amine, and triethylaluminium (TEAL). The middle zone in the reactor above the distribution plate comprises an inlet for the polymerization catalyst that can be fed to the reactor in combination with nitrogen (N2). The middle zone of the reactor also comprises an outlet to the product discharge tank. The top zone of the reactor comprises an outlet for a top recycle stream, wherein the outlet for the top recycle stream is connected to an inlet of the compressor. The compressor comprises an outlet for compressed fluids and the outlet of the compressor is connected to an inlet for compressed fluids of the cooling unit. The cooling unit comprises an outlet for providing a bottom recycle stream, which outlet of the cooling unit is connected to the inlet at the bottom of the reactor.

The fluidized bed reactor may be of a multi-zone fluidized bed reactor (FBR) system as shown in FIG. 1. The multi-zone reactor of this example is a multi-zone reactor operable in condensed mode, which multi-zone reactor comprises a first zone, a second zone, a third zone, a fourth zone and a distribution plate, wherein the first zone is separated from the second zone by the distribution plate, wherein the multi-zone reactor is extended in the vertical direction wherein the second zone of the multi-zone reactor is located above the first zone and wherein the third zone of the multi-zone reactor is located above the second zone, and wherein the fourth zone of the multi-zone reactor is located above the third zone wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor wherein the largest diameter of the inner wall of the third zone is larger than the largest diameter of the inner wall of the second zone.

The multi-zone reactor of this example can operate in a so-called "condensing mode" or "condensed mode" which is effective for removal of the heat produced during the exothermic polymerization. In this mode, heat removal is achieved by cooling the gaseous recycle stream to a temperature below its dew point, resulting in the condensation of at least a part of the recycle stream to form a bottom recycle stream containing liquid and gas. The thus formed bottom recycle stream is then introduced into the fluidized bed polymerization reactor, where the liquid portion will vaporize upon exposure to the heat of the reactor, which vaporization will remove heat from the reactor and enables feeding of one or more very highly active catalysts. Details of the FBR which operates in a condensing mode are further described in Application no. EP 13195141.0, incorporated herein by reference.

The FIGURE illustrates an FBR system comprising a multi-zone reactor (8), a compressor (400) and a cooling unit (5).

The multi-zone reactor (8) of this example is extended in the vertical direction and comprises four reaction zones (1), (2), (3) and (4). Zone (4) can preferably be located above zone (3), zone (3) can be located above zone (2) and zone (2) can located above zone (1) in the vertical direction toward the top of the reactor.

The first zone (1) comprises a first inlet for receiving a bottom recycle stream (10) and the first zone (1) is separated from the second zone (2) by a distribution plate (6). The second zone (2) comprises a first inlet for receiving a solid polymerization catalyst (20). The third zone (3) comprises a first outlet for providing polyolefin (30). This outlet can also be located in the second zone (2). At least one of the second zone (2) or the third zone (3) can comprise at least one section where the inner wall of the reactor is either in the form of a gradually increasing inner diameter or a continuously opening cone in the vertical direction towards the top of the reactor. Here both the second zone (2) and the third zone (3) comprise such sections designated respectively by 2A and 3A. In the second zone (2), at least one section where the inner wall of the reactor is either in the form of a gradually increasing inner diameter or a continuously opening cone in the vertical direction towards the top of the reactor (2A) can preferably be located immediately above the distribution plate (6). Immediately above the distribution plate (6) can thereby preferably mean so that pooling of liquid can be reduced or avoided. Moreover, at least one of the second zone (2) or the third zone (3) can comprise at least one section where the inner wall of the reactor is either in the form of a cylinder. Here both the second zone (2) and the third zone (3) comprise such sections designated respectively by 2B and 3B. The fourth zone (4) comprises a first outlet for a top recycle stream (40) which is connected to a first inlet of the compressor (400) via a first connection means (AA). The fourth zone is thereby a disengagement zone, which may be designed so that polymer particles preferably do not reach that zone or do not stay as little as possible in that zone but rather return to the third zone (3) or the second zone (2), especially for example to allow avoiding the clogging of the compressor (400). The connection means (AA) comprise a first inlet for receiving a feed (60).

The compressor (400) comprises a first outlet for compressed fluids (50) which is connected to a first inlet for compressed fluids of the cooling unit (5) via a second connection means (BB). The second connection means (BB) comprise an inlet for receiving a feed (70). The cooling unit (5) comprises a first outlet for providing the bottom recycle stream (10) which is connected to the first inlet of the first zone (1).

The FBR system may further comprise a polymer withdrawal system, a polymer degassing system and a vent gas recovery system (not shown in FIG. 1). The outlet for the recovered components (in liquid form) (80) from the vent gas recovery system may be transported to the first inlet (70) of the second connection means (BB) by means of pump (7).

This system can suitably be used for a process for continuous polymerization comprising
supplying the second zone (2) with a solid polymerization catalyst using the first inlet for receiving the solid polymerization catalyst (20)
supplying a feed (60) comprising an α-olefin monomer to the first connection means (AA)
optionally supplying a feed (70) comprising condensable inert components to the second connection means (BB)
withdrawing the polyolefin (30) using the first outlet of the second zone (2) and/or the third zone (3) and
circulating fluids from the first outlet of the fourth zone (4) to the first inlet of the first zone
wherein the fluids are circulated by
compressing the feed (60) and the top recycle stream (40) using the compressor (400) to form the compressed fluids (50)
subsequently cooling the compressed fluids (50) using the cooling unit (5) to below the dew point of the compressed fluids to form the bottom recycle stream (10) and
feeding the bottom recycle stream (10) to the first zone of the multi-zone reactor (8) via the inlet for receiving the bottom recycle stream of the first zone, and
wherein the superficial gas velocity in this process is in the range of 0.5 to 5 m/s.

The feed (60) comprises a chain transfer agent, for example hydrogen and may further comprise gaseous α-olefin monomers and insert gaseous components, for example nitrogen.

The feed (70) comprises condensable inert components, for example a condensable inert component selected from the group of alkanes having 4 to 20 carbon atoms, preferably 4 to 8 carbon atoms, and mixtures thereof, for example propane, n-butane, isobutene, n-pentane, isopentane, neo-pentane, n-hexane, isohexane or other saturated hydrocarbons having 6 C-atoms, n-heptane, n-octane and other saturated hydrocarbons having 7 or 8 C-atoms and any mixtures thereof; and may further comprise condensable α-olefin monomers, α-olefin comonomers and/or mixtures thereof.

The above FBR system has the advantage that introduction of higher amounts of liquid is allowed without causing destabilization of the fluidized bed.

Catalysts

Ziegler-Natta catalysts may typically comprise a transition metal halide, such as titanium or vanadium halide, and an organometallic compound of a metal of Group 1, 2 or 3, typically trialkylaluminum compounds, which may serve as a co-catalyst for the transition metal halide. Ziegler-Natta catalyst may further comprise an internal electron donor which may form a complex with the alkyl aluminum and/or the transition metal. The transition metal halide may be supported on a magnesium halide or complexed thereto. Such Ziegler-Natta catalyst may also be impregnated onto an inorganic support such as silica or alumina. For more details on Ziegler-Natta catalysts, see for example, U.S. Pat. Nos. 3,687,920, 4,086,408, 4,376,191, 5,019,633, 4,482,687, 4,101,445, 4,560,671, 4,719,193, 4,755,495, 5,070,055 all of which are herein incorporated by reference.

The metallocene catalyst is preferably a metallocene catalyst of the formula I below

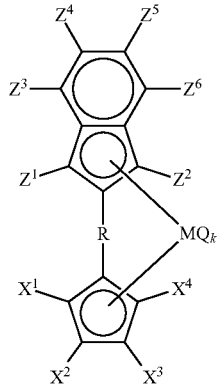

Formula I wherein:

M is a transition metal selected from the group consisting of lanthanides and metals from group 3, 4, 5 or 6 of the Periodic System of Elements; M is preferably selected from the group consisting of Ti, Zr and Hf with Zr being most preferred.

Q is an anionic ligand to M, k represents the number of anionic ligands Q and equals the valence of M minus two divided by the valence of the anionic Q ligand R is a hydrocarbon bridging group, such as alkyl. R preferably contains at least one sp2-hybridised carbon atom that is bonded to the indenyl group at the 2-position.

Z and X are substituents.

In another preferred embodiment the metallocene catalyst is of the formula II below

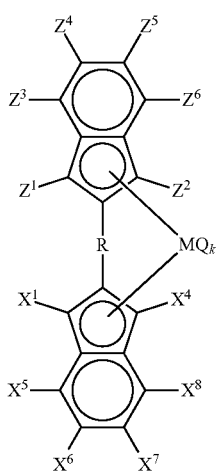

Formula II wherein:

M is a transition metal selected from the group consisting of lanthanides and metals from group 3, 4, 5 or 6 of the Periodic System of Elements; M is preferably selected from the group consisting of Ti, Zr and Hf with Zr being most preferred.

Q is an anionic ligand to M, k represents the number of anionic ligands Q and equals the valence of M minus two divided by the valence of the anionic Q ligand R is a hydrocarbon bridging group, such as alkyl. R preferably contains at least one sp2-hybridised carbon atom that is bonded to the indenyl group at the 2-position.

Z and X are substituents.

Bridging group R in the metallocene catalysts of formula's I and II above preferably contains at least one aryl group. For example, the aryl group may be a monoaryl group such as phenylene or naphthalene or a biaryl group, such as biphenylidene or binaphthyl. Preferably the bridging group R stands for an aryl group, preferably R stands for a phenylene or biphenylidene group. The bridging group R is connected to the indenyl groups via a sp2 hybridised carbon atom, for example a phenylene group may be connected via the 1 and the 2 position, a biphenylene group may be connected via the 2 and 2'-position, a naphthalene group may be connected via the 2 and 3-position, a binapthyl group may be connected via the 2 and 2'-position. Preferably R stands for a phenylene group that is connected to the indenyl groups via the 1 and the 2 position. R may be 2,2'-biphenylene.

The substituents X in formulas I and II above may each separately be hydrogen or a hydrocarbon group with 1-20 carbon atoms (e.g. alkyl, aryl, aryl alkyl). Examples of alkyl groups are methyl, ethyl, propyl, butyl, hexyl and decyl. Examples of aryl groups are phenyl, mesityl, tolyl and cumenyl. Examples of aryl alkyl groups are benzyl, pentamethylbenzyl, xylyl, styryl and trityl. Examples of other substituents are halides, such as chloride, bromide, fluoride and iodide, methoxy, ethoxy and phenoxy. Also, two adjacent hydrocarbon radicals may be connected with each other in a ring system. X may also be a substituent which instead of or in addition to carbon and/or hydrogen may comprise one or more heteroatoms from group 14, 15 or 16 of the Periodic System of Elements. Examples of such a heteroatom containing substituents are alkylsulphides (like MeS-, PhS-, n-butyl-S—), amines (like Me2N—, n-butyl-N—), Si or B containing groups (like Me3Si— or Et2B—) or P-containing groups (like Me2P— or Ph2P—). Preferably the X substituents are hydrogen.

The substituents Z in formulas I and II above may each separately be a substituent as defined above for substituent X. Z1 and Z2 substituents can together with the X1 and X4 substituents form a second bridge that connects the indenyl group with the cyclopentadienyl group in the indenyl compound.

Examples of metallocene catalysts for use in the present invention are [ortho-bis(4-phenyl-2-indenyl)-benzene]zirconiumdichloride, [ortho-bis(5-phenyl-2-indenyl)-benzene]zirconiumdichloride, [ortho-bis(2-indenyl)benzene]zirconiumdichloride, [ortho-bis(2-indenyl)benzene]hafniumdichloride, [ortho-bis(1-methyl-2-indenyl)-benzene]zirconiumdichloride, [2.2'-(1.2-phenyldiyl)-1.1'-dimethylsilyl-bis(indene)]zirconiumdichloride, [2,2'-(1,2-phenyldiyl)-1,1'-diphenylsilyl-bis(indene)] zirconiumdichloride, [2,2'-(1.2-phenyldiyl)-1.1'-(1.2-ethanediyl)-bis(indene)]zirconiumdichloride, [2.2'-bis(2-indenyl)biphenyl]zirconiumdichloride and [2,2'-bis(2-indenyl)biphenyl]hafniumdichloride.

The metallocene catalyst preferably contains zirconium as metal group M. The zirconium amount in the metllocene catalyst is preferably in the range of 0.02-1 wt %, preferably 0.15-0.30 wt % based on the metallocene catalyst or the metallocene catalyst composition.

The metallocene catalyst may preferably be supported on a support, optionally with a metallocene catalyst activator and optionally a modifier, forming a supported metallocene catalyst. The metallocene catalyst may especially also be for example a composition comprising a support containing a metallocene catalyst, a metallocene catalyst activator and a modifier described in EP2610269, incorporated herein by reference, forming a metallocene catalyst composition. Such metallocene catalyst composition has an advantage that reactor fouling is reduced.

The term "metallocene catalyst activator" as used herein is to be understood as any compound which can activate the metallocene catalyst, preferably so that it is capable of polymerization of monomers, in particular olefins. Preferably, the metallocene catalyst activator is an aluminoxane, a perfluorophenylborane and/or a perfluorophenylborate, preferably alumoxane, more preferably methylaluminoxane and/or modified methylaluminoxane.

The support in the metallocene catalyst composition or supported metallocene catalyst of the present invention can be an organic or inorganic material and is preferably porous. Examples of organic material are cross-linked or functionalized polystyrene, PVC, cross-linked polyethylene. Examples of inorganic material are silica, alumina, silica-alumina, inorganic chlorides such as $MgCl_2$, talc and zeolite. Mixtures of two or more of these supports may be used. The preferred particle size of the support is from 1 to 120 micrometres, preferably of from 20 to 80 micrometres and the preferred average particle size is from 40 to 50 micrometres.

The preferred support is silica. The pore volume of the support is preferably of from 0.5 to 3 $cm^3/g$. The preferred surface area of the support material is in the range of from 50 to 500 $m^2/g$. The silica used in this invention is preferably dehydrated prior to being used to prepare the metallocene catalyst or the metallocene catalyst composition.

Preferably, the modifier is the reaction product of an aluminum compound of formula (1)

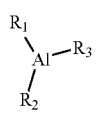

(1)

and an amine compound of formula (2)

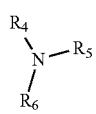

(2)

wherein

R1 is hydrogen or a branched or straight, substituted or unsubstituted hydrocarbon group having 1-30 carbon atoms, R2 and R3 are the same or different and selected from branched or straight, substituted or unsubstituted hydrocarbon groups having 1-30 carbon atoms and R4 is hydrogen or a functional group with at least one active hydrogen R5 is hydrogen or a branched, straight or cyclic, substituted or unsubstituted hydrocarbon group having 1-30 carbon atoms, R6 is a branched, straight or cyclic, substituted or unsubstituted hydrocarbon group having 1-30 carbon atoms.

In a preferred embodiment of the invention, the amounts of aluminum compound and amine compound are selected such that in the modifier the molar ratio of Al to N is in the range of 1:3 to 5:1, preferably 1:2 to 3:1, more preferably 1:1.5 to 1.5:1. Within this range a good combination of technical effects of the present invention can be obtained. If the molar ratio of Al to N is below 1:3 then fouling and/or sheeting may occur, whereas if the molar ratio of Al to N is above 5:1 catalyst productivity decreases, i.e. the amount of polymer produced per gram of catalyst decreases. The most preferred molar ratio is 1:1.

In the compound of formula (2), R4 is a hydrogen or a functional group with at least one active hydrogen, R5 is hydrogen or a branched, straight or cyclic, substituted or unsubstituted hydrocarbon group having 1-30 carbon atoms, R6 is a branched, straight or cyclic, substituted or unsubstituted hydrocarbon group having 1-30 carbon atoms (carbon atoms of the substituents included). The branched, straight or cyclic, substituted or unsubstituted hydrocarbon group having 1-30 carbon atoms is preferably an alkyl group having 1-30 carbon atoms, for example an alkyl group having 1-30 carbon atoms, for example a straight, branched or cyclic alkyl, an aralkyl group having 1-30 carbon atoms or an alkaryl group having 1-30 carbon atoms.

The amine compound used in the reaction to prepare the modifier may be a single amine compound or a mixture of two or more different amine compounds.

The amine compound used for preparing the modifier of the present invention preferably has a hydrocarbon group of at least eight carbon atoms, more preferably at least twelve carbon atoms, for example an alkyl group of 1 to fifteen carbon atoms. The amine compound may be a primary, secondary or tertiary amine. The amine compound is preferably a primary amine.

In an embodiment of the present invention the amine compound is selected from the group consisting of octadecylamine, ethylhexylamine, cyclohexylamine, bis(4-aminocyclohexyl)methane, hexamethylenediamine, 1,3-benzenedimethanamine, 1-amino-3-aminomethyl-3,5,5-trimethylcyclohexane and 6-amino-1,3-dimethyluracil.

The aluminum compound used in the reaction to prepare the modifier may be a single aluminum compound or a mixture of two or more different aluminum compounds. R1, R2 and R3 may each independently stand for a branched or straight, substituted or unsubstituted hydrocarbon group having 1-30 carbon atoms, for example may each independently stand for an alkyl, preferably R1, R2 and R3 all stand for an alkyl, more preferably R1, R2 and R3 are the same.

The aluminum compound of the present invention is preferably a trialkylaluminum (R1=R2=R3=alkyl or a dialkylaluminumhydride (R1=hydrogen, R2=R3=alkyl). In an embodiment of the present invention the aluminum compound is selected from the group consisting of of tri-methylaluminum, tri-ethylaluminum, tri-propylaluminum, tri-butylaluminum, tri-isopropylaluminum tri-isobutylaluminum, or di-methylaluminumhydride, di-ethylaluminumhydride, di-propylaluminumhydride, di-butylaluminumhydride, di-isopropylaluminumhydride, di-isobutylaluminumhydride. These materials are readily available and have good reactivity with amines. An alkyl as used herein will be understood by the skilled person as meaning a hydrocarbon group that contains only carbon and hydrogen atoms and is derived from alkanes such as methane, ethane, propane, butane, pentane, hexane etc. The alkyl may be branched, straight or cyclic. Preferably R1, R2 and R3 may each independently stand for a straight or branched alkyl.

In a preferred embodiment the aluminum compound is a trialkylaluminum, further preferred tri-isobutylaluminum, and the amine compound is a primary amine, preferably the amine compound is selected from the group consisting of octadecylamine, ethylhexylamine, cyclohexylamine, bis(4-aminocyclohexyl)methane, hexamethylenediamine, 1,3-benzenedimethanamine, 1-amino-3-aminomethyl-3,5,5-trimethylcyclohexane and 6-amino-1,3-dimethyluracil, preferably octadecylamine or cyclohexylamine.

Preferably, the modifier may be the reaction product of cyclohexylamine and tri-isobutylaluminum.

In some embodiments, the modifier may also for example be an amine compound of formula (3)

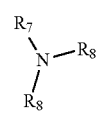

(3)

where R7 is hydrogen or a linear or branched alkyl group of from 1 to 50 carbon atoms; R8 is a hydroxy group of a $(CH_2)_x$ radical and where x is an integer from 1 to 50.

The modifier may be selected from at least one of the group of compounds represented by the following chemical formula: $C_{18}H_{37}N(CH_2CH_2OH)_2$, $C_{12}H_{25}N(CH_2CH_2OH)_2$ and $(CH_3(CH_2)_7(CH)_2(CH_2)_7OCOCH_2(CHOH)_4CH_2OH$. The modifier may be a sorbital monooleate compound or a tertiary ethoxylated amine.

step (a)

Step (a) is preferably performed in such a way that the introduction of the metallocene catalyst is progressively reduced over a period of time, for example over a period of time of 0.5 to 2 hours or 0.5 to 4 hours, until it is discontinued, while optionally simultaneously the introduction of continuity aid agent is also progressively reduced over a period of time, for example over a period of time of 0.5 to 2 hours or 0.5 to 4 hours, until it is also discontinued. a continuity aid agent is introduced.

The continuity aid agent may be the same or different as the modifier as described above and is the reaction product of an aluminum compound of formula (1)

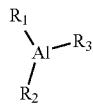
(1)

and an amine compound of formula (2)

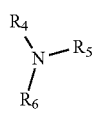
(2)

wherein

R1 is hydrogen or a branched or straight, substituted or unsubstituted hydrocarbon group having 1-30 carbon atoms, R2 and R3 are the same or different and selected from branched or straight, substituted or unsubstituted hydrocarbon groups having 1-30 carbon atoms and R4 is hydrogen or a functional group with at least one active hydrogen R5 is hydrogen or a branched, straight or cyclic, substituted or unsubstituted hydrocarbon group having 1-30 carbon atoms, R6 is a branched, straight or cyclic, substituted or unsubstituted hydrocarbon group having 1-30 carbon atoms.

In a preferred embodiment of the invention, the amounts of aluminum compound and amine compound are selected such that in the continuity aid agent the molar ratio of Al to N is in the range of 1:3 to 5:1, preferably 1:2 to 3:1, more preferably 1:1.5 to 1.5:1, further preferred between 1.5:1 and 3.5:1, further preferred between 2:1 and 3:1.

Particularly preferred as the continuity aid agent is the reaction product of tri-isobutylaluminum and octadecylamine or cyclohexylamine.

The ratio between the metallocene catalyst or metallocene catalyst composition on one hand and the continuity aid agent on the other hand may thereby be maintained. Moreover, the gas composition in the reactor may preferably be kept constant during step (a), preferably for example for a period of time of time of 0.5 to 2 hours or 0.5 to 4 hours. This allows further growth of polymer particles and thus, the reduction of fines formation. Further, this allows continuation of the production of the desired product.

In the cases where the first polymerization process is operated in a condensed mode or a supercondensed mode, then a process transitioning can be performed from the condensed mode or the supercondensed mode to the 'dry mode'. This can also be done in step (a) and thus for example preferably before step (b).

Moreover, the fluidized bed reactor may be subjected to a "mini-kill" or a "partial-kill" in which a reversible catalyst killer, preferably CO, is introduced to render the metallocene catalyst inactive, or in other words, incapable of polymerization (even temporary), for example in step (a). Reversible catalyst killer may thereby mean that in absence and/or very low concentrations (for example below 10 ppm) of the reversible catalyst killer and/or after a certain time the activity of the catalyst can be restored. This can allow a fast process transitioning from condensed mode to dry mode. Typically, the reversible catalyst killer, especially for example CO, may injected to the reactor, where its concentrations inside the reactor does for example not exceed 20 ppm of the cycle gas flow composition. Preferably the concentration of the reversible catalyst killer inside the reactor can be for example from 0.1 to 10 ppm, preferably from 0.1 to 5 ppm, more preferably from 0.1 to 3 ppm.

After the introduction of the desired amount of the reversible catalyst killer, especially for example CO to the reactor, the fluidized bed in the reactor can be kept under circulation for a period of time sufficient to ensure the "partial kill". At least one reversible catalyst killer can thereby be used for example before, after or together with at least one irreversible catalyst killer. Preferably, at least one reversible catalyst killer can be used (for example in step (a)) before an irreversible catalyst killer, such as especially for example cyclohexylamine, is used (for example in step (b)).

Subsequently, product withdrawal via polymer discharge system can be stopped while product purge bin and gas vent recovery system may be disconnected from the entire polymerization process, for example in step (a) and thus for example preferably before or after step (b).

step (b)

In step (b), "catalyst killers", preferably comprising at least one irreversible catalyst killer, are employed to reduce and/or terminate polymerization within the fluidized bed reactor. For the purposes of this invention, the catalyst killers do not include minor amounts of catalyst killers that may be contained in the monomer, the comonomer or condensing agent feed streams during normal polymerization operation (for example, impurities such as CO, CO2, internal olefins, etc.). Cyclohexylamine can be used as irreversible catalyst killer. An effective amount of cyclohexylamine can thus be introduced to at least partially deactivate the metallocene catalyst. The expressions 'at least partially deactivate' is herein understood to mean that the catalyst productivity is decreased by at least 80%, preferably at least 90%. Preferably, the catalyst productivity is decreased by about 100%, i.e. the catalyst is deactivated.

There are two general types of catalyst killers. First, reversible catalyst killers which may be used in the invention are those such as, but not limited to, for example, carbon monoxide (CO), carbon dioxide ($CO_2$), internal olefins, 2-butene and the like, internal dienes, 2-4 hexadiene and the like, alkenes and butadienes. Reversible catalyst killers typically initially inhibit catalyst activity and polymerization for a period of time, but, do not irreversibly deactivate the catalyst. In fact, after a period of time under normal polymerization conditions the catalysts reactivate and polymerization will continue. Two or more irreversible catalyst killers can also be used in combination.

These reversible catalyst killers can be used in any combination or order of introduction in the process of this invention, preferably in step (b).

Second, there are irreversible catalyst killers, those killers that irreversibly inactivate a catalyst's ability to polymerize olefins. According to the invention, cyclohexylamine is used as the irreversible catalyst killer.

In some embodiments of the invention, only cyclohexylamine is used as the irreversible catalyst killer.

In some embodiments of the invention, one or more known further irreversible catalyst killer can be used, e.g. oxygen, water ($H_2O$), alcohols, glycols, phenols, ethers, carbonyl compounds such as ketones, aldehydes, carboxylic acids, esters, fatty acids, alkynes such as acetylene, nitriles, nitrous compounds, pyridine, pyroles, carbonylsulfide (COS) and mercaptans. Amines other than cyclohexylamine may also be used as the additional irreversible catalyst killer. The amine compounds used as irreversible catalyst killers in the present invention may preferably be an amine comprising a hydrocarbon group with at least eight carbon atoms, more preferably with at least twelve carbon atoms. An amine compound used as irreversible catalyst killer can thereby preferably be a primary amine. Two or more irreversible catalyst killers can thereby also be used in combination.

In an embodiment of the present invention an amine compound used as irreversible catalyst killer is selected from the group consisting of octadecylamine, ethylhexylamine, 2-ethylhexylamine, cyclohexylamine, bis(4-aminocyclohexyl)methane, hexamethylenediamine, 1,3-benzenedimethanamine, 1-amino-3-aminomethyl-3,5,5-trimethylcyclohexane and 6-amino-1,3-dimethyluracil.

These irreversible catalyst killers can be used in any combination or order of introduction in the process of this invention, preferably in step (b).

At least one irreversible catalyst killer, especially for example cyclohexalamine, may also be used with one or more other irreversible catalyst killers and/or one or more reversible catalyst killers, especially for example in step (b) according to the present invention.

It is thus not beyond the scope of this invention that a mixture of one or more of these reversible and irreversible catalyst killers can be combined before introduction into a reactor, however, one of ordinary skill in the art will recognize that some of these killers could react with each other and are thus better introduced separately.

Preferably, once the metallocene catalyst or metallocene catalyst composition feed has been interrupted, a reversible catalyst killer is introduced into the reactor for a period of time sufficient to reduce the activity of the metallocene catalyst in the reactor. This can be done for example in step (a) or in step (b). The use of the reversible catalyst killer decreases the likelihood of fines formation in the reactor where the process of the invention takes place within the reactor. In embodiment of the invention, prior to introducing an irreversible catalyst killer, the productivity of the metallocene catalyst may first be reduced the introduction/use of a reversible catalyst killer. The preferred reversible catalyst killers of the invention is CO. The amount of reversible catalyst killer used depends on the size of the reactor and the quantity and type of catalysts and catalyst activator in the reactor. Preferably, the reversible catalyst killer of the invention can be used for example in a concentration based on the residual catalyst components, preferably based on the amount of metal M of the metallocene catalyst or on total amounts of metal components in the metallocene catalyst and any activator and/or continuity aid agent.

In some embodiments the reversible killer may be used for example in a ratio of between 1:1 and 40:1, preferably between 2:1 and 40:1, further preferred between 5:1 and 15:1 by weight with respect to metal M of the metallocene catalyst or to total amounts of metal components in the metallocene catalyst and any activator and/or continuity aid agent.

In some embodiments once the reversible catalyst killer has been introduced into the reactor, a period of time of about 1 minute to 4 hours, preferably 2 minutes to 2 hours, alternatively 4 minutes to 60 minutes or preferably 5 minutes to 30 minutes may pass before introducing an irreversible catalyst killer. The duration can depend on the nature and amount of catalyst and volume of the reactor and the mode of operation. In a gas phase reactor there may be a fluidized bed that is typically very large in volume and quantity of polymer. Thus, a sufficient period of time is needed to allow the reversible catalyst killer to disperse throughout the reactor.

An irreversible catalyst killer may be introduced into the reactor, especially after a reversible catalyst killer has been introduced to the reactor in step (b). As described above, cyclohexylamine may thereby be used as the irreversible catalyst killer.

In a preferred embodiment the irreversible catalyst killer may be introduced into the reactor in a ratio of for example in the range of 0.1:1 to 100:1, preferably 0.1:1 to 10:1, more preferably about 0.5:1 to about 5:1, even more preferably about 0.7:1 to about 3:1 and most preferably greater than about 1:1 to less than about 2:1 by weight or by mole with respect to metal M of the metallocene catalyst or to total amounts of metal components in the metallocene catalyst and any activator and/or continuity aid agent.

When any metallocene activator or continuity aid agent is used with the metallocene catalyst, and such activator or continuity aid agent is capable of reacting with the Ziegler-Natta catalyst, the irreversible catalyst killer can be used in a concentration based on the total metal components in the metallocene catalyst and any activator and/or continuity aid agent in the reactor.

Preferably, the irreversible catalyst killer can be used for example in an amount in the range of 100% to 125% of that necessary to fully deactivate all of the active metallocene catalyst. This allows to at least partially deactivate the metallocene catalyst (so that it can also preferably not reactive itself) before introducing a second incompatible. This may also avoid an excess amount of irreversible killer that could remain in the reactor and at least partially deactivate the second incompatible catalyst upon its injection into the reactor.

As mentioned above, the amount of the irreversible catalyst killer to be added may be determined based on the measurement of the static of the reactor.

In yet another embodiment once the irreversible catalyst killer has been introduced into the reactor a period of time of about 1 minute to 4 hours, preferably 2 minutes to 2 hours, alternatively 4 minutes to 60 minutes or preferably 5 minutes to 30 minutes pass before continuing the transitioning process. Again, this can be done to allow sufficient circulation inside the reactor.

step (c)

Typically, in the process of the invention it is important to substantially reduce the concentration of impurities from the reactor, particularly also for example the concentration of the irreversible catalyst killer, which can negatively impact the Ziegler-Natta catalyst performance upon its introduction into a reactor. Thus, an organometallic compound is introduced into the reactor in step (c) which is capable of reacting with cyclohexylamine.

The organometallic compound may react with the irreversible catalyst killer, cyclohexylamine and/or other catalyst poisons. Such organometallic compounds can include for example, $BX_3$, where X is a halogen, $R^1R^2Mg$, ethyl magnesium, $R^4CORMg$, $RCNR$, $ZnR_2$, $CdR_2$, $LiR$, $SnR_4$ $SiR_4$ or $AlR_3$, where R are hydrocarbon or alkoxy groups or halogens that could, preferably independently, be the same or different.

The organometallic compounds useful are those compounds of Group 1, 2, 3 and 4 organometallic alkyls, alkoxides, and halides. The preferred organometallic compounds are lithium alkyls, magnesium or zinc alkyls, magnesium alkyl halides, aluminum alkyls, silicon alkyl, silicon alkoxides and silicon alkyl halides. The more preferred organometallic compounds are aluminum alkyls and magnesium alkyls.

Preferred organometallic compounds are the aluminum compound of formula (1) as described above. The organometallic compounds used in step c) may be same or different from the aluminum compound of formula (1) used for the preparation of the modifier as described above.

Especially preferred the organometallic compound added in step (c) may be tri-isobutylaluminum.

The organometallic compound reacts with the remaining cyclohexylamine, which reactant is circulated in the reactor for a period of time before the Ziegler-Natta catalyst is introduced. The reactant may act as a continuity aid agent, which may assist in reducing fouling and/or sheeting on the walls of the reactor and/or reactor components.

Once the organometallic compound has been introduced into the reactor, a period of time of about 2 minutes to 2 hours, preferably 3 minutes to 1 hour, preferably 5 minutes to 45 minutes, alternatively 10 minutes to 30 minutes may pass before proceeding with step (d).

step (d)

Before introducing the Ziegler-Natta catalyst, the gas composition of the reactor may be degassed, especially for example through a procedure known in the art as pressure purging, and a new composition inside the reactor for the second polymerization with the Ziegler-Natta catalyst may be build up. This procedure may used to remove, purge, or reduce in the process of the invention, for example, the catalyst killers and by-products thereof and reactants to a lower level.

Once this procedure is complete the gas composition in the reactor system is adjusted for the Ziegler-Natta catalyst. Hence, a gas composition for the second polymerization is built up in the reactor and the reactor temperature is adjusted in step (d). For a given catalyst to produce a given product of a certain density and melt index at a certain temperature, which generally depends on how well a catalyst incorporates comonomer and responses to a molecular weight controlling agent as hydrogen, a certain gas composition may be be present in the reactor.

Generally the gas contains at least one alpha-olefin having from 2 to 20 carbon atoms, preferably 2-15 carbon atoms, for example, alpha-olefin of ethylene, propylene, butene-1, pentene-1, 4-methylpentene-1, hexene-1, octene-1, decene-1 and cyclic olefins such as styrene. Other monomers can include polar vinyl, dienes, norborene, acetylene and aldehyde monomers. In the preferred embodiment, the gas composition contains ethylene and at least one alpha-olefin having 3 to 15 carbon atoms.

Typically, the gas composition also contains an amount of hydrogen to control the melt index of the polymer to be produced. In typical circumstances the gas may or example also contain an amount of condensing agents with the balance of the gas composition made up of a non-condensable inerts, for example, nitrogen.

Depending on the Ziegler-Natta catalyst to be introduced into the reactor the gas composition, such as the comonomer and hydrogen gas concentrations, can be increased or decreased. Preferably, however, it can be increased.

step (d2)

Preferably, after step (d) and before step (e), a continuity aid agent, as described above may be introduced. This allows to reduce the formation of fines.

step (e)

Subsequently, the Ziegler-Natta catalyst is introduced into the reactor, optionally together with a co-catalyst. The second polymerization is started. catalyst feed system In some embodiments, the metallocene catalyst may be introduced from the same catalyst feeding system of the Ziegler-Natta catalyst. In this case, the catalyst feeding system is preferably physically cleaned before the Ziegler-Natta catalyst is introduced from the catalyst feeding system. This prevents the risk of a trace amount of the metallocene catalyst remaining in the catalyst feeding system, leading to the formation of unacceptable amount of gel or drop in catalyst productivity due to catalyst incompatibility.

In more preferred embodiments, the metallocene catalyst is introduced from a first catalyst feeding system and the Ziegler-Natta catalyst is introduced from a second catalyst feeding system separated from the first catalyst feeding system. This prevents the risk of a trace amount of the metallocene catalyst remaining in the catalyst feeding system leading to the formation of unacceptable amount of gel or drop in catalyst productivity due to catalyst incompatibility, without the time-consuming physical cleaning of the catalyst feeding system. The physical cleaning of the catalyst feeding system typically takes 4-12 hours.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention claimed is:

1. A process for transitioning from a first continuous polymerization in a gas phase reactor conducted in the presence of a metallocene catalyst to a second polymerization conducted in the presence of a Ziegler-Natta catalyst in the gas phase reactor wherein the metallocene catalyst and the Ziegler-Natta catalyst are incompatible, the process comprising:
   (a) discontinuing the introduction of the metallocene catalyst into the gas phase reactor;
   (b) introducing an effective amount of cyclohexylamine into the reactor to at least partially deactivate the metallocene catalyst;
   (c) introducing an organometallic compound into the reactor and reacting the organometallic compound with cyclohexylamine;
   (d) degassing the gas composition of the reactor and building up a new composition inside the reactor for the second polymerization with the Ziegler-Natta catalyst; and
   (e) introducing the Ziegler-Natta catalyst into the reactor.

2. The process according to claim 1, wherein the organometallic compound is a trialkylaluminum compound.

3. The process according to claim 1, further comprising the step (d2), which is introduced after step (d) and before step (e) wherein a reaction product of an aluminum compound of formula (1)

(1)

and an amine compound of formula (2)

(2)

wherein
- $R_1$ is hydrogen or a branched or straight, substituted or unsubstituted hydrocarbon group having 1-30 carbon atoms,
- $R_2$ and $R_3$ are the same or different and selected from branched or straight, substituted or unsubstituted hydrocarbon groups having 1-30 carbon atoms,
- $R_4$ is hydrogen or a functional group with at least one active hydrogen,
- $R_5$ is hydrogen or a branched, straight or cyclic, substituted or unsubstituted hydrocarbon group having 1-30 carbon atoms, and
- $R_6$ is a branched, straight or cyclic, substituted or unsubstituted hydrocarbon group having 1-30 carbon atoms is introduced into the reactor.

4. The process according to claim 3, wherein the compound of formula (1) is tri-isobutylaluminum and the compound of formula (2) is cyclohexylamine, octadecylamine, 2-ethylhexylamine, ethylhexylamine, bis(4-amino cyclohexyl)methane, hexamethylenediamine, 1,3-benzenedimethanamine, 1-amino-3-aminomethyl-3,5,5-trimethylcyclohexane 6-amino-1,3-dimethyluracil or a mixture thereof.

5. The process according to claim 1, wherein the metallocene catalyst comprises a support containing a metallocene catalyst, a metallocene catalyst activator and an optional modifier.

6. The process according to claim 5, wherein the metallocene catalyst is selected from the group consisting of: [ortho-bis(4-phenyl-2-indenyl)-benzene]zirconium dichloride, [ortho-bis(5-phenyl-2-indenyl)-benzene]zirconium dichloride, [ortho-bis(2-indenyl)benzene]zirconium dichloride, [ortho-bis(2-indenyl)benzene]hafnium dichloride, [ortho-bis(1-methyl-2-indenyl)-benzene]zirconium dichloride, [2.2'-(1.2-phenyldiyl)-1.1'-dimethylsilyl-bis(indene)]zirconiumdichloride, [2,2'-(1,2-phenyldiyl)-1, l'-diphenylsilyl-bis(indene)]zirconium dichloride, [2,2'-(1.2-phenyldiyl)-1.1'-(1.2-ethanediyl)-bis(indene)]zirconium dichloride, [2.2'-bis(2-indenyl)biphenyl]zirconium dichloride and [2,2'-bis(2-indenyl)biphenyl]hafnium dichloride.

7. The process according to claim 1, wherein the metallocene catalyst is introduced from a first catalyst feeding system and the Ziegler-Natta is introduced from a second catalyst feeding system separate from the first catalyst feeding system.

8. The process according to claim 1, wherein the polymerization is conducted in a fluidized bed reactor.

9. The process according to claim 1, wherein the first continuous polymerization is operated in a condensed mode in which 5-17.4 wt % of the gas composition entering the gas phase reactor is liquid or a supercondensed mode in which more than 17.4 wt % of the gas composition entering the gas phase reactor is liquid.

10. The process according to claim 1, wherein the gas phase reactor is a multi-zone reactor operable in condensed mode, which multi-zone reactor comprises a first zone, a second zone, a third zone, a fourth zone and a distribution plate,
- wherein the first zone is separated from the second zone by the distribution plate,
- wherein the multi-zone reactor is extended in the vertical direction
- wherein the second zone of the multi-zone reactor is located above the first zone and
- wherein the third zone of the multi-zone reactor is located above the second zone,
- and wherein the fourth zone of the multi-zone reactor is located above the third zone
- wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor,
- wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor, and
- wherein the largest diameter of the inner wall of the third zone is larger than the largest diameter of the inner wall of the second zone.

11. The process according to claim 1, wherein a reversible catalyst killer is introduced to render the metallocene catalyst inactive.

12. The process according to claim 2, wherein the trialkylaluminum compound is triethylaluminum, trimethylaluminum, tri-isobutylaluminum, or tri-n-hexylaluminum.

13. The process according to claim 12, wherein the trialkylaluminum compound tri-isobutylaluminum.

14. The process according to claim 4, wherein the compound of formula (1) is cyclohexylamine or octadecylamine.

15. The process according to claim 4, wherein the compound of formula (1) is cyclohexylamine.

16. The process according to claim 5, wherein the optional modifier is [A] is present, and is a reaction product of an aluminum compound of formula (1)

and an amine compound of formula (2)

wherein
- $R_1$ is hydrogen or a branched or straight, substituted or unsubstituted hydrocarbon group having 1-30 carbon atoms,
- $R_2$ and $R_3$ are the same or different and selected from branched or straight, substituted or unsubstituted hydrocarbon groups having 1-30 carbon atoms,
- $R_4$ is hydrogen or a functional group with at least one active hydrogen,
- $R_5$ is hydrogen or a branched, straight or cyclic, substituted or unsubstituted hydrocarbon group having 1-30 carbon atoms, and
- $R_6$ is a branched, straight or cyclic, substituted or unsubstituted hydrocarbon group having 1-30 carbon atoms, or

[B] an amine compound of formula (3)

wherein
- R$_7$ is hydrogen or a linear or branched alkyl group of from 1 to 50 carbon atoms, and
- R$_8$ is a hydroxy group of a (CH$_2$)$_X$ radical wherein x is an integer from 1 to 50.

17. The process according to claim 14, wherein the optional modifier is a reaction product of compound of formula (1) being tri-isobutylaluminum and the compound of formula (2) being cyclohexylamine.

18. The process of claim 11, wherein a reversible catalyst killer is CO.

* * * * *